(12) United States Patent
Ogata et al.

(10) Patent No.: US 8,616,609 B2
(45) Date of Patent: Dec. 31, 2013

(54) FUEL LID STRUCTURE

(71) Applicants: Toyoda Gosei Co., Ltd, Kiyosu (JP); Toyota Jidosha Kabushiki Kaisha, Toyota (JP)

(72) Inventors: Masahiro Ogata, Kiyosu (JP); Shinjiro Tomida, Kiyosu (JP); Tomohiro Shirai, Kiyosu (JP); Masayuki Suzuki, Nissin (JP); Masayuki Noda, Okazaki (JP); Masahiro Nakazato, Toyota (JP)

(73) Assignees: Toyoda Gosei Co., Ltd., Aichi-pref. (JP); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/685,797

(22) Filed: Nov. 27, 2012

(65) Prior Publication Data

US 2013/0134737 A1    May 30, 2013

(30) Foreign Application Priority Data

Nov. 29, 2011   (JP) ................................. 2011-259731

(51) Int. Cl.
*B60K 15/05* (2006.01)
(52) U.S. Cl.
USPC ....................................................... 296/97.22
(58) Field of Classification Search
USPC .................................................... 296/97.22
See application file for complete search history.

(56) References Cited

U.S. PATENT DOCUMENTS

| | | | | |
|---|---|---|---|---|
| 5,044,678 A | * | 9/1991 | Detweiler | 292/144 |
| 5,676,416 A | * | 10/1997 | Cooper | 296/97.22 |
| 5,884,958 A | * | 3/1999 | Oddenino | 296/97.22 |
| 6,189,959 B1 | * | 2/2001 | VanAssche et al. | 296/207 |
| 6,499,789 B2 | * | 12/2002 | Moll et al. | 296/97.22 |
| 7,185,938 B2 | * | 3/2007 | Beck | 296/97.22 |
| 7,377,559 B2 | * | 5/2008 | Gramss et al. | 292/163 |
| 7,766,410 B2 | * | 8/2010 | Tseng et al. | 296/97.22 |
| 7,905,535 B2 | * | 3/2011 | Zentner et al. | 296/97.22 |
| 7,914,063 B2 | * | 3/2011 | Lederer et al. | 296/97.22 |
| 7,922,231 B2 | * | 4/2011 | Schoenow | 296/97.22 |
| 8,292,113 B2 | * | 10/2012 | Nakaya | 220/315 |
| 2013/0134737 A1 | * | 5/2013 | Ogata et al. | 296/97.22 |

FOREIGN PATENT DOCUMENTS

| | | |
|---|---|---|
| JP | 11-303481 A | 11/1999 |
| JP | 2001-063388 A | 3/2001 |
| JP | 2002-240581 A | 8/2002 |
| JP | 2007-210562 A | 8/2007 |

OTHER PUBLICATIONS

Office Action mailed Oct. 29, 2013 issued in corresponding JP patent application No. 2011-259731 (and partial English translation).

* cited by examiner

*Primary Examiner* — Glenn Dayoan
*Assistant Examiner* — Gregory Blankenship
(74) *Attorney, Agent, or Firm* — Posz Law Group, PLC

(57) ABSTRACT

The present invention prevents a lock pin from coming out of a lock hole even if a fuel lid locked in a bolted manner by intrusion of the lock pin into the lock hole is pushed toward a vehicle body. A second lock hole is formed in an inner peripheral wall of the lock hole and a protruding portion formed on the lock pin is engaged in the second lock hole when the fuel lid is pushed toward the vehicle body.

5 Claims, 3 Drawing Sheets

FUEL LID STRUCTURE

TECHNICAL FIELD

The present invention relates to a fuel lid structure of an automobile and specifically to a fuel lid structure having a bolt locking device.

BACKGROUND ART

A recessed fuel filler box is formed in an outer panel of a vehicle body around a filler opening and a fuel lid is coupled to the fuel filler box by a hinge so as to be able to open and close the fuel filler box. The fuel lid can be in a closed position for closing the fuel filler box and an open position for opening the fuel filler box. In the open position, refueling through the filler opening can be carried out. In the closed position, a surface of the fuel lid and a surface of the vehicle body form a continuous surface design to thereby improve appearance quality. In the closed position, a lock pin protruding from the vehicle body is intruded into a lock hole in a lock portion formed on a back face side of the fuel lid to be locked in a closed state.

However, in a simple bolt lock, when a wire or a plate-shaped member is inserted through a gap between a fuel lid and an outer panel of a vehicle body to push a tip end of a lock pin, the lock pin may come out of a lock hole to bring the fuel lid into an open state in some cases. Therefore, as proposed in Japanese Patent Application Laid-Open No. 2001-063388 or Japanese Patent Application Laid-Open No. 2002-240581, there is a fuel lid structure in which a periphery of a tip end of a lock pin protruding from a lock hole is shielded. In this way, it is possible to avoid the above-described problem to thereby prevent fuel theft.

On the other hand, as proposed in Japanese Patent Application Laid-Open No. 2007-210562, there is a fuel lid structure having a mechanism in which a fuel lid moves to an open side as a lock pin moves in a direction to release the lock. In this way, it is possible to open the fuel lid even when the fuel lid is frozen.

SUMMARY OF INVENTION

However, even if the fuel lid is locked in a bolted manner by the lock pin, the lock pin comes out of the lock hole due to movement of the fuel lid to accidentally open the fuel lid in some cases when the fuel lid is pushed a few times toward the vehicle body.

The present invention has been made to solve this problem and it is the object to prevent, the lock pin from coming out of the lock hole even when the fuel lid locked in the bolted manner by the lock pin is pushed toward the vehicle body.

A fuel lid structure according to the invention and for solving the above-described problem includes a fuel lid coupled by a hinge to a recessed fuel filler box provided to an outer panel of a vehicle body around a filler opening and configured to be in a closed position for closing the fuel filler box and in an open position for opening the fuel filler box; a lock portion formed on a back face side of the fuel lid and having a lock hole; and a lock in for intruding into the lock hole in the closed position to lock the fuel lid into a closed state. When the fuel lid is further pushed toward the vehicle body in the closed position, a first engaging portion formed at the lock portion and a second engaging portion formed at the lock pin are engaged with each other.

ADVANTAGEOUS EFFECTS OF INVENTION

With the fuel lid structure according to the invention, the first engaging portion formed at the lock portion and the second engaging portion formed at the lock pin are engaged with each other when the fuel lid is further pushed toward the vehicle body in the closed position and therefore the lock pin does not come out of the lock hole. As a result, it is possible to reliably prevent the fuel lid from accidentally opening in the closed position.

Preferably, the first engaging portion and the second engaging portion are not engaged with each other in the closed position. In this way, to cancel the lock, it is possible to easily pull the lock pin out of the lock hole to release the lock without obstruction.

Preferably, the first engaging portion and the second engaging portion are engaged with each other in recessed and protruding engagement and a direction of the engagement between the recessed and protruding portions is substantially parallel to a direction in which the fuel lid is further pushed toward the vehicle body in the closed position. In this way, it is possible to further reliably prevent the lock pin from coming out of the lock hole when the fuel lid is pushed toward the vehicle body in the closed position.

DESCRIPTION OF EMBODIMENTS

Figure 1:
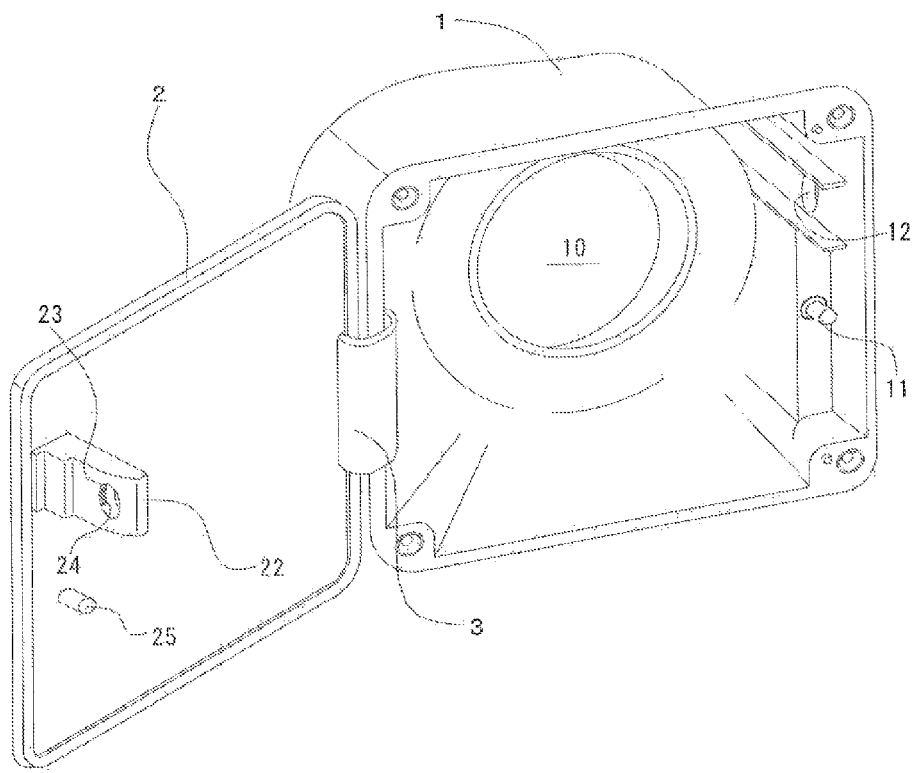
FIG. 1 is a perspective view of a fuel lid structure according to an embodiment of the present invention.

The fuel lid is for opening and closing a fuel filler box and a metal outer panel of the same surface design as a vehicle body is disposed on a surface thereof. On a back face of the fuel lid, a lock portion having a lock hole is formed. This lock portion may be formed of a sheet metal and welded to the back face of the fuel lid. Preferably, however, the fuel lid is formed as a two-layered structure including a metal outer layer and a resin inner layer and the lock portion is molded integrally in molding the inner layer. Alternatively, the fuel lid may be formed by resin outer and inner members.

The lock portion preferably has a structure such that a lock pin engaged in the lock hole is not pushed when a wire or a plate-shaped member is inserted through a gap between the fuel lid and an outer panel of the vehicle body. For this purpose, it is possible to employ the structures having shields as disclosed in Japanese Patent Application. Laid-Open No. 2001-063388 and Japanese Patent Application Laid-Open No. 2002-240581, a structure in which a lock hole is formed as a blind hole, and a structure in which a lock hole is deep so that a tip end of the lock pin does not protrude from the lock hole.

A first engaging portion is formed at the lock portion and a second engaging portion is formed at a lock pin. The first engaging portion and the second engaging portion are engaged with each other when the fuel lid in a closed position is further pushed toward the vehicle body. By this engagement, the lock pin is prevented from coming out of the lock hole.

The first engaging portion and the second engaging portion may be engaged by using recessed and protruding portions, for example. For example, a second lock hole having a central axis intersecting with a direction of a central axis of the lock hole is formed in the lock portion as the first engaging portion, and a protruding portion protruding toward the second lock hole in the closed position is formed at the lock pin as the second engaging portion. In this way, if the fuel lid is further pushed toward the vehicle body in the closed position, the protruding portion is engaged in the second lock hole to thereby prevent the lock pin from coming out of the lock hole.

Because the direction of the central axis of the lock hole is substantially coaxial with a moving direction of the lock pin, it suffices if a direction of the central axis of the second lock hole intersects with the direction of the central axis of the lock hole. For reliable engagement between the second lock hole and the protruding portion, an angle formed between a peripheral wall end face and a peripheral wall inner face is preferably a right angle or an acute angle in a shape of the peripheral wall of the second lock hole which is engaged with a root of the protruding portion. For more reliable engagement between the second lock hole and the protruding portion, a protruding direction of the protruding portion formed at the lock pin and the direction of the central axis of the second lock hole are preferably parallel to a direction in which the fuel lid is further pushed toward the vehicle body from the closed position.

Alternatively, a protrusion may be formed as the first engaging portion at the lock portion and a recessed portion may be formed as the second engaging portion in the lock pin. In this way, if the fuel lid is further pushed toward the vehicle body in the closed position, the protrusion is engaged in the recessed portion and therefore it is possible to prevent the lock pin from coming out of the lock hole.

The fuel lid is coupled to the fuel filler box by a hinge. The coupling method is not especially limited and may be any conventional methods. It is also preferable to use a torsion spring for biasing the fuel lid in the opening direction or the closing direction. It is also preferable to provide a switch mechanism in which a biasing force is stored when the fuel lid is further pushed toward the vehicle body in the closed position and the fuel lid is caused by the stored biasing force to move and return to the closed position when the pushing of the fuel lid is stopped. In the fuel lid structure having such a switch mechanism, an amount of movement of the fuel lid when the fuel lid is further pushed toward the vehicle body in the closed position is large and therefore it is possible to increase a distance of engagement between the first engaging portion and the second engaging portion to thereby effectively prevent the lock pin from coming out of the lock hole.

With reference to the drawings, modes for carrying out the present invention will be specifically described below by using embodiments.

Embodiment 1

Figure 2:
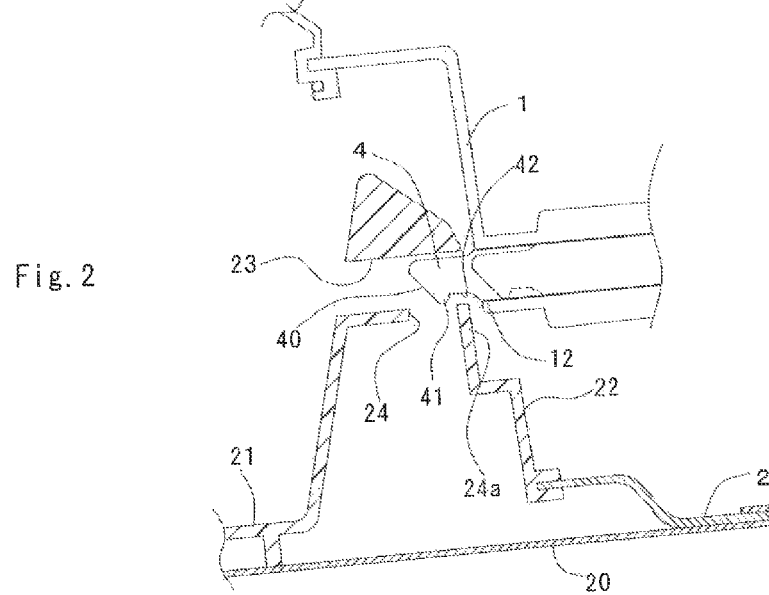
FIG. 2 is a sectional view of an essential portion of the fuel lid structure according to the embodiment of the invention, in which a fuel lid is in a closed position.

FIG. 2 is a perspective view of a fuel lid structure in the present embodiment and in a state in which a fuel lid is open at the time of refueling or the like. This fuel lid structure includes a recessed fuel filler box 1 provided to an outer panel of the vehicle body and a fuel lid 2. The fuel lid 2 is swingably coupled by a hinge portion 3 to an edge portion of the fuel filler box 1.

A filler opening 10 appears at a bottom portion of the fuel filler box 1 and is airtightly closed with a cap (not shown). A switch 11 is provided at a portion with which a swinging end portion of the fuel lid 2 comes in contact. In the switch 11, a spring and a protrusion control mechanism (not shown) are incorporated. Every time a tip end protruding from the fuel filler box 1 is pushed and the pushing of the tip end is cancelled, the tip end of the switch 11 is alternately switched between two protruding amounts. In a side wall of the fuel filler box 1, an entrance opening 12 which a lock pin 4 (described later) comes into and goes out of is formed.

FIG. 2 is a sectional view of an essential portion in the closed position. The fuel lid 2 is formed by a metal outer member 20 having the same surface design as the outer panel of the vehicle body and a resin inner member 21. The outer member 20 and the inner member 21 are integrally coupled. The same paint as that of the outer panel of the vehicle body is applied to the surface of the outer member 20.

A lock portion 22 protruding toward the fuel filler box 1 in the closed position is integrally formed with the inner member 21. In the lock portion 22, a lock hole 23 passing through the lock portion 22 and coaxial with the entrance opening 12 in the closed position is formed. In a part of a peripheral wall forming the lock hole 23, a rectangular second lock hole 24 passing through the peripheral wall and open into the lock hole 23 is formed.

Figure 3:
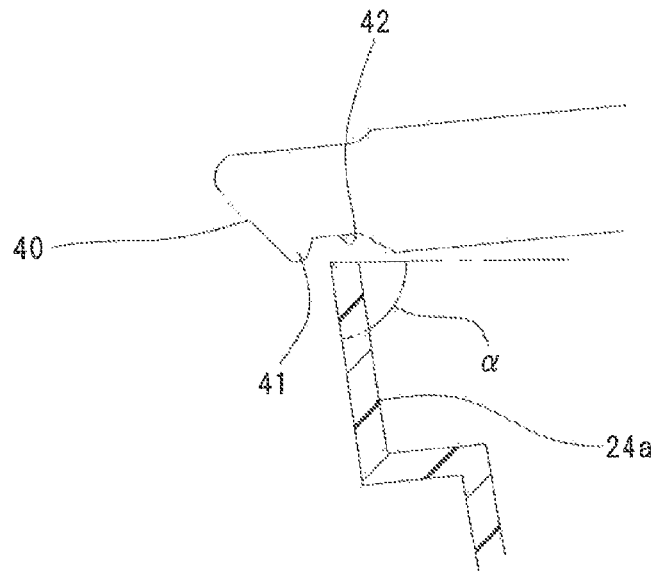
FIG. 3 is an enlarged sectional view of an essential portion in FIG. 2.

A central axis of the second lock hole 24 is substantially parallel to a direction, in which the fuel lid 2 is pushed toward the vehicle body in the closed position, and is substantially orthogonal with a central axis of the lock hole 23. In a shape of a peripheral wall of the second lock hole 24, as shown in an enlarged view in FIG. 3, an angle α formed between a tip end face and an inner peripheral face of a rear end wall 24a positioned on a side of the swinging end portion of the fuel lid 2 is an acute angle close to a right angle. In a vicinity of the lock portion 22, a protrusion 25 protruding toward the fuel filler box 1 similarly in the closed position is formed.

A torsion spring (not shown) is disposed in the hinge portion 3 to bias the fuel lid 2 in an opening direction and a closing direction. In other words, if the fuel lid 2 is turned in the opening direction from the closed position, a biasing force is stored in the torsion spring until the fuel lid 2 reaches a predetermined position and then the fuel lid 2 is biased in the opening direction by the biasing force after the fuel lid 2 passes the predetermined position. On the other hand, if the fuel lid 2 is turned in the closing direction from the open position, a biasing force is stored in the torsion spring until the fuel lid 2 reaches a predetermined position and then the fuel lid 2 is biased by the biasing force after the fuel lid 2 passes the predetermined position.

The vehicle body is provided with a resin lock pin 4 driving of which is controlled by an electromagnetic actuator (not shown) and the lock pin 4 goes into and out of the fuel filler box 1 through an opening 12 formed in the fuel filler box 1. The lock pin 4 protrudes from the opening 12 and enters the lock hole 23 to lock the fuel lid 2 in the closed position of the fuel lid 2. At the time of refueling, the lock pin 4 retreats from the lock hole 23 to thereby release the lock. The lock pin 4 is substantially in a circular columnar shape and a tapered face 40 is formed at a tip end of the lock pin 4. A protruding portion 41 for protruding toward the second lock hole 24 in the closed position is formed at a rear end of the tapered face 40 and a groove portion 42 adjacent to the protruding portion 41 is formed to extend in a direction perpendicular to a surface of paper of FIG. 2.

Operation of the fuel lid device in the present embodiment will be described below.

First, in the open position where the fuel lid 2 has opened the fuel filler box 1, the lock pin 4 is in a retreat position shown by a one dot chain line in FIG. 2 and it is possible to carry out the refueling through the filler opening 10 without obstruction. The switch 11 is in a first position where it is protruding the most toward the opening of the fuel filler box 1. After the refueling, the filler opening 10 is closed with a cap (not shown) and the fuel lid 2 is turned in the closing direction. At this time, the torsion spring (not shown) is actuated, the biasing force is stored in the torsion spring until the fuel lid 2 reaches the predetermined position, and then the fuel lid 2 is biased in the closing direction by the biasing force after the fuel lid 2 passes the predetermined position. In a position where the protrusion 25 on the fuel lid 2 comes in contact with the switch 11 and stops, the surface of the fuel lid 2 is in a slightly higher position than the surface of the outer panel of the vehicle body. At this time, the lock pin 4 is in the retreat position shown by the one-dot chain line in FIG. 2.

Then, if the fuel lid 2 is further pushed toward the vehicle body, the switch 11 is pushed in by the protrusion 25 and a biasing force is stored in the spring incorporated in the switch 11. If the switch 11 is pushed in a predetermined distance, a clicking sound of the protrusion control mechanism is produced. If an operator who heard the sound stops the pushing, the switch 11 is caused by the biasing force of the spring to protrude to a second position which is at a smaller protrusion distance than the first position. Then, the fuel filler box 1 stops in the closed position where the surface of the fuel lid 2 is continuous with the surface of the outer panel of the vehicle body. At the same time or by an operation after that, the electromagnetic actuator (not shown) is driven and the lock pin 4 moves forward to enter the lock hole 23 through the opening 12 to lock the fuel lid 2. In this state, the protruding portion 41 is not engaged in the second lock hole 24.

Figure 4:
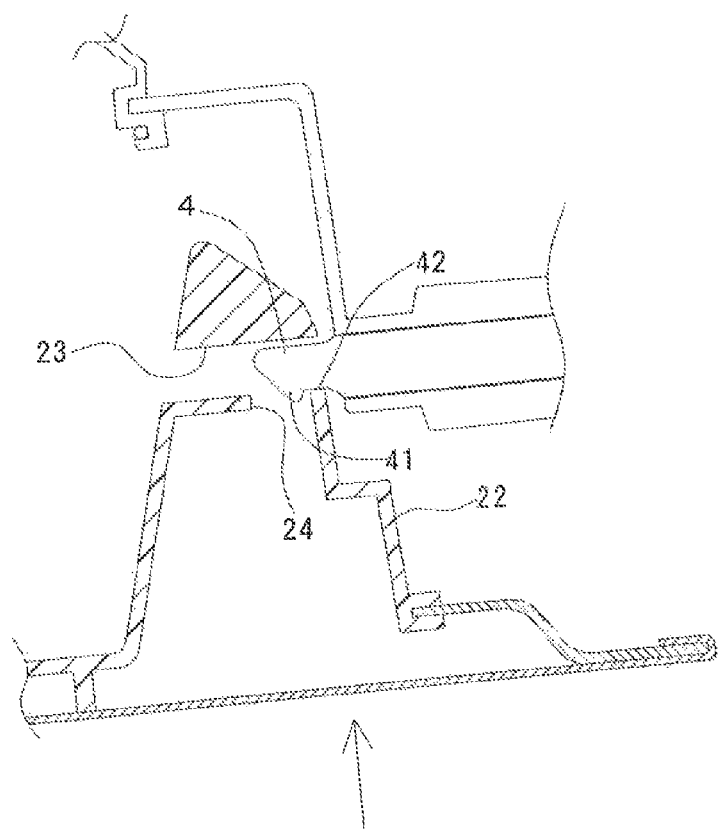
FIG. 4 is a sectional view of an essential portion of the fuel lid, structure according to the embodiment of the invention, in which the fuel lid is pushed from the closed position toward the vehicle body.

If the fuel lid 2 is further pushed toward the vehicle body in this state, the protruding portion 41 is engaged in the second lock hole 24 and the rear end wall 24a of the second lock hole 24 is engaged in the groove portion 42 as shown in FIG. 4. Because the angle α between the tip end face and the inner peripheral face of the rear end wall 24a is the acute angle as described above, the rear end wall 24a is reliably engaged with the groove portion 42 or a root of the protruding portion 41. Therefore, the lock pin 4 is prevented from coming out of the lock hole 23. Moreover, because the tip end of the lock pin 4 is positioned in the lock hole 23, it is difficult to insert the wire or the plate-shaped member through the gap between the fuel lid 2 and the outer panel of the vehicle body to push the tip end of the lock pin, which prevents fuel theft.

To open the fuel lid 2 from the closed position, the electromagnetic actuator (not shown) is driven by an operation by an occupant or opening or closing of the door and the lock pin 4 retreats from the lock hole 23 to release the lock. At this time the protruding portion 41 is not engaged in the second lock hole 24 and therefore the lock pin 4 can retreat without obstruction.

If the fuel lid 2 is further pushed toward the vehicle body in this state, the switch 11 is pushed by the protrusion 25 and the biasing force is stored. When the switch 11 is pushed in a predetermined distance, the clicking sound of the protrusion control mechanism is produced. If the operator who heard the sound stops the pushing, the switch 11 is caused by the biasing force of the spring incorporated in the switch 11 to come into the first position and the fuel lid 2 comes into a slightly open position from the closed position. Therefore, it is possible to put fingers on the swinging end portion of the fuel lid 2 to easily turn the fuel lid 2 in the opening direction. At this time, the torsion spring (not shown) is actuated, the biasing force is stored in the torsion spring until the fuel lid 2 reaches the predetermined position, and then the fuel lid 2 is biased by the biasing force in the opening direction after the fuel lid 2 passes the predetermined position.

Embodiment 2

Figure 5:
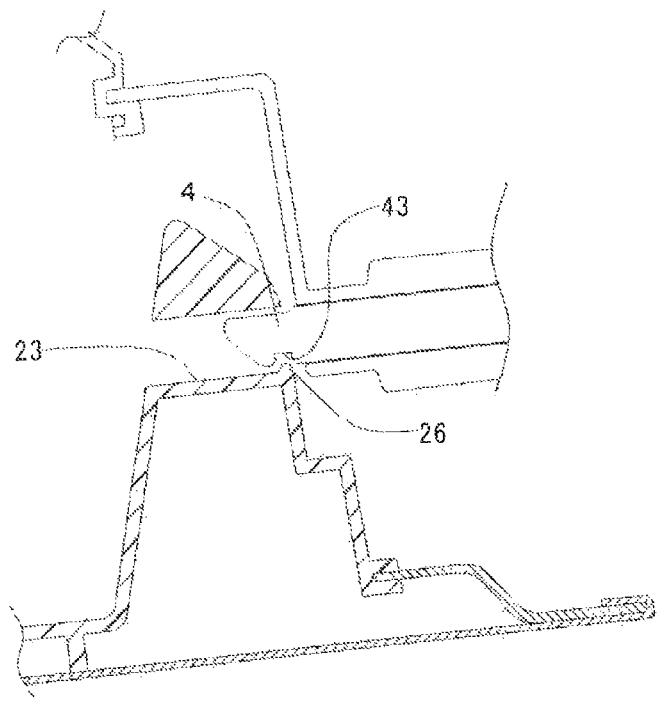
FIG. 5 is a sectional view of an essential portion of a fuel lid structure according to a second embodiment of the invention, in which a fuel lid is in a closed position.

FIG. 5 shows a fuel lid structure according to the present embodiment. This fuel lid structure is similar to the structure in embodiment 1 except that a ridge 26 protruding into a lock hole 23 and extending in a direction perpendicular to a surface of the paper is formed on a lock portion 22 instead of the second lock hole 24 and that a recessed groove 43 extending in the direction perpendicular to the surface of the paper is formed in a part of the lock pin 4.

Figure 6:
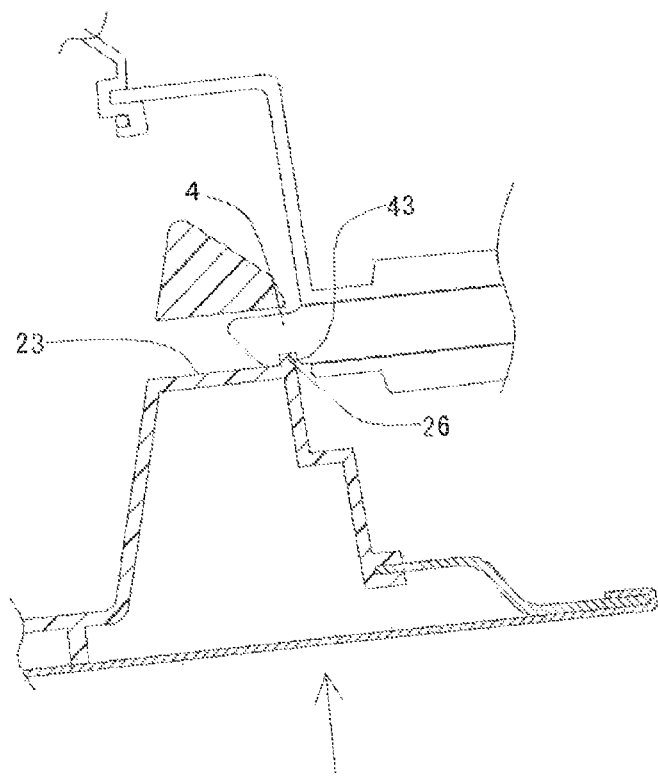
FIG. 6 is a sectional view of an essential portion of the fuel lid structure according to the second embodiment of the invention, in which the fuel lid is pushed from the closed position toward the vehicle body.

In a closed position shown in FIG. 5, the ridge 26 is not engaged in the recessed groove 43 and therefore the lock pin 4 can retreat from the lock hole 23 without obstruction. However, if a fuel lid 2 is further pushed toward a vehicle body in the closed position, the ridge 26 is engaged in the recessed groove 43 as shown in FIG. 6. Therefore, the lock pin 4 is reliably prevented from coming out of the lock hole 23.

The invention claimed is:

1. A fuel lid structure comprising:
a fuel lid coupled by a hinge to a recessed fuel filler box provided to an outer panel of a vehicle body around a filler opening and configured to be in a closed position for closing the fuel filler box and an open position for opening the fuel filler box;
a lock portion formed on a back face side of the fuel lid and having a lock hole; and
a lock pin intruding into the lock hole in the closed position to lock the fuel lid into a closed state,
wherein, when the fuel lid is further pushed toward the vehicle body in the closed position, a first engaging portion formed at the lock portion and a second engaging portion formed at the lock pin are engaged with each other.

2. A fuel lid structure according to claim 1, wherein the first engaging portion and the second engaging portion are not engaged with each other in the closed position.

3. A fuel lid structure according to claim 1, wherein the first engaging portion and the second engaging portion are engaged with each other by engagement between recessed and protruding portions; and a direction of the engagement between the recessed and protruding portions is substantially parallel to a direction in which the fuel lid is further pushed toward the vehicle body in the closed position.

4. A fuel lid structure according to claim 3, wherein the first engaging portion is a peripheral wall of a second lock hole having a central axis intersecting with a direction of a central axis of the lock hole; and the second engaging portion is a protruding portion protruding toward the second lock hole in the closed position.

5. A fuel lid structure according to claim 4, wherein an angle formed between a tip end face and an inner peripheral face of at least a part of the peripheral wall of the second lock hole is an acute angle; and the part of the peripheral wall is engaged with a root of the protruding portion.

* * * * *